(No Model.)
C. S. NORCROSS.
GARDEN CULTIVATOR.
No. 450,523. Patented Apr. 14, 1891.
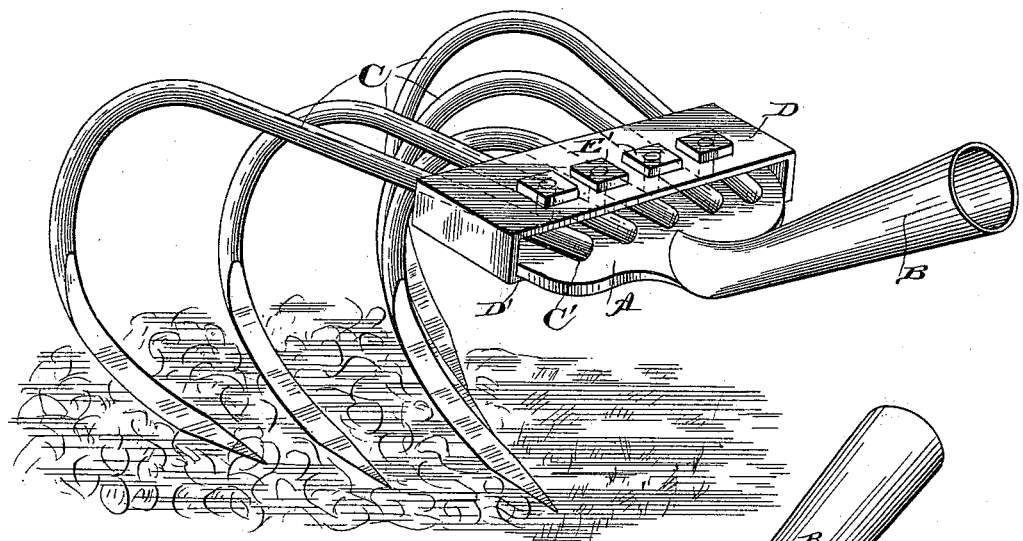
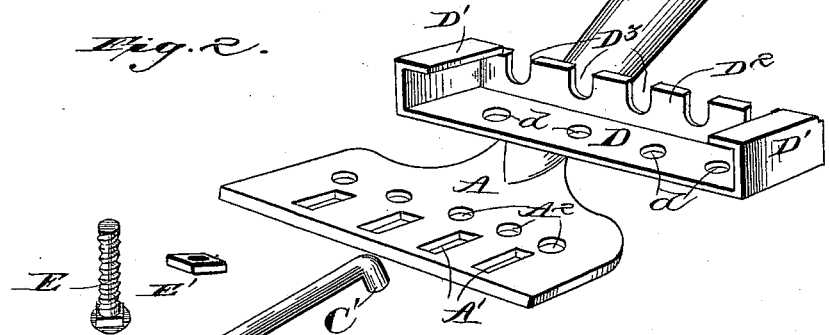
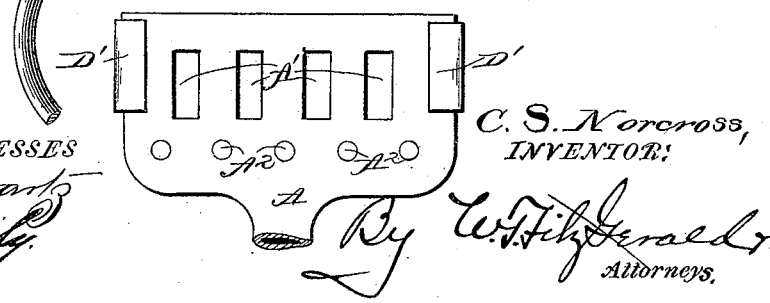
WITNESSES
A. J. Schwartz
J. F. Reily
C. S. Norcross,
INVENTOR:
By W. J. Fitzgerald & Co.
Attorneys.

UNITED STATES PATENT OFFICE.

CAMILLO SIVORI NORCROSS, OF WALNUT GROVE, ILLINOIS.

GARDEN-CULTIVATOR.

SPECIFICATION forming part of Letters Patent No. 450,523, dated April 14, 1891.

Application filed October 29, 1890. Serial No. 369,751. (No model.)

*To all whom it may concern:*

Be it known that I, CAMILLO SIVORI NORCROSS, a citizen of the United States, residing at Walnut Grove, in the county of McDonough and State of Illinois, have invented certain new and useful Improvements in Garden-Cultivators; and I do hereby declare the following to be a full, clear, and exact description of the invention, such as will enable others skilled in the art to which it appertains to make and use the same.

My invention consists in certain new and useful improvements in garden-cultivators, which will be hereinafter fully described and claimed, reference being had to the accompanying drawings, in which—

Figure 1 is a perspective view of my new and improved cultivator. Fig. 2 is a perspective view showing the bearing-plate separated from the cultivator, and Fig. 3 is a bottom plan view of the cultivator.

The same letters of reference indicate corresponding parts in all the figures.

Referring to the several parts by letter, A indicates the flat head-plate of the cultivator, which is formed with the socket B, in which the lower end of the tool-handle is secured.

C indicates the curved tines, the rear ends of which rest upon the head-plate A, being formed at their extremities with the downwardly-extending projections C', which fit in openings $A^2$, formed in the rear part of the head-plate, as shown. The forward part of the plate A is formed with the longitudinal slots A', which lie between the stems of the tines C, running in the same direction. Upon the top of the tines, parallel with the front edge of the head-plate A, I secure a metal bearing-plate D, the ends D' of which are bent down and under the sides of the head-plate, thereby securing the bearing-plate at both ends to the head-plate over the tines. The bearing-plate is further secured by means of four bolts E, which are passed up through the slots A, between the tines, and through apertures $d$ in the bearing-plate, when nuts E' are screwed upon their threaded upper ends, being screwed down tightly upon the top of the bearing-plate. The tines are held from moving sidewise by the front edge $D^2$ of the bearing-plate, which is bent down at right angles and formed with the recesses $D^3$, in which the tines fit.

I am aware that a garden-cultivator has heretofore been patented consisting of a flat head-plate on which the curved tines are bolted, the bolts passing through the tines and the head-plate; but the great objection to this cultivator is that the tines have a tendency to break at the bolt-holes, where the securing-bolts pass through them, this necessarily being their weakest point. I entirely overcome this difficulty by my invention, in which I entirely dispense with the bolt-holes through the tines, leaving the tines their full strength. The strain on the tines, when they are pressed by the pressure on them when in use up against the forward part of the bearing-plate, comes on them at a point where they are as strong as at any point in their length. The bearing-plate, with its ends bent down and under the head-plate and its downwardly-bent recessed front edge, holds the tines firmly to the head-plate.

To adjust the width of the spaces between the several tines, it is only necessary to loosen the four nuts E' and by tapping the bearing-plate with a hammer slide it backward, and it will be seen that, as the tines fitting the recessed front edge of the plate B are pivotally secured at their rear ends, as the bearing-plate is slid backward or forward the tines will be simultaneously spread apart or drawn together, when the nuts E' are again tightened. By this construction I have a certain means of adjusting all of the tines by moving the one plate, and they will all be separated for exactly the same distance.

It will be seen that my construction cheapens the cost of the cultivator, as I dispense with the bolt-holes in the tines, which require time and labor to make, as it is difficult to form a bolt-hole in the narrow tine-stem, making it slow and therefore expensive.

The longitudinal slots A' in the head-plate permit of the backward and forward adjustment of the bearing-plate and its securing-bolts E.

Having thus described my invention, what I claim, and desire to secure by Letters Patent, is—

1. In a garden-cultivator, the combination of the head-plate A, having the handle-socket and the series of openings A², the tines having the rear end projections C', the peculiarly-formed bearing-plate D, having its ends D' bent down, with their extremities extending under the head-plate, and having its front edge D² bent down and formed with the recesses D³, in which the tines fit, and the securing-bolts E, passing through the head-plate and bearing-plate, substantially as set forth.

2. The combination of the head-plate having the handle-socket and formed with the longitudinal slots A' and the rear openings A², the tines having the rear pivot projections C', the adjustable bearing-plate D, having its ends D' bent down and under the head-plate, having its front edge bent down and formed with the recesses D³, and formed with the bolt-holes $d$, and the bolts E, having their nuts on their threaded upper ends, substantially as set forth.

In testimony whereof I affix my signature in presence of two witnesses.

CAMILLO SIVORI NORCROSS.

Witnesses:
C. S. TURPIN,
F. L. CURTIS.